(12) United States Patent
Kopp et al.

(10) Patent No.: US 9,987,909 B2
(45) Date of Patent: Jun. 5, 2018

(54) CONVERTIBLE VEHICLE HAVING A WIND DEFLECTOR

(71) Applicant: Webasto-Edscha Cabrio GmbH, Stockdorf (DE)

(72) Inventors: Georg Kopp, Stockdorf (DE); Franz Haberl, Stockdorf (DE); Richard Seidl, Stockdorf (DE)

(73) Assignee: WEBASTO-EDSCHA CABRIO GMBH, Stockdorf (DE)

(*) Notice: Subject to any disclaimer, the term of this patent is extended or adjusted under 35 U.S.C. 154(b) by 0 days. days.

(21) Appl. No.: 15/219,853

(22) Filed: Jul. 26, 2016

(65) Prior Publication Data
US 2017/0043653 A1 Feb. 16, 2017

(30) Foreign Application Priority Data
Aug. 10, 2015 (DE) .......... 10 2015 113 136

(51) Int. Cl.
B60J 7/20 (2006.01)
B60J 7/22 (2006.01)

(52) U.S. Cl.
CPC .......... *B60J 7/202* (2013.01); *B60J 7/223* (2013.01)

(58) Field of Classification Search
CPC .... B62D 35/007; B62D 37/02; B62D 35/001; B62D 35/005; B62D 35/02; B62D 35/00; B62D 35/008; B60J 7/22; B60J 7/223

USPC .............. 296/180.5, 180.1, 217, 76, 193.09; 701/49, 36
See application file for complete search history.

(56) References Cited

U.S. PATENT DOCUMENTS

| 5,810,424 A * | 9/1998 | Kuttner | B60J 7/223 296/180.1 |
| 7,699,381 B2 * | 4/2010 | Goetz | B60J 7/223 296/180.1 |
| 8,210,598 B2 * | 7/2012 | Lehmann | B60J 7/223 296/180.1 |
| 2007/0040413 A1 * | 2/2007 | Rimmelspacher | B60J 7/223 296/180.5 |
| 2008/0067834 A1 * | 3/2008 | Erb | B60J 7/19 296/180.1 |

FOREIGN PATENT DOCUMENTS

DE 3914035 A1 4/1990

* cited by examiner

*Primary Examiner* — D Glenn Dayoan
*Assistant Examiner* — Sunsurraye Westbrook
(74) *Attorney, Agent, or Firm* — Fitch, Even, Tabin & Flannery LLP

(57) ABSTRACT

A convertible vehicle having a displaceable top and a top storage space, which can be closed using a storage space cover, as well as a wind deflector, which is displaceable between a retracted stowage position and at least one erected function position and can have an inner frame on which a wind deflector function element is spanned. The wind deflector can have an outer frame, to which the inner frame is pivotably mounted and which is pivotably mounted to the storage space cover.

6 Claims, 12 Drawing Sheets

CONVERTIBLE VEHICLE HAVING A WIND DEFLECTOR

CROSS-REFERENCE TO RELATED APPLICATIONS

This application claims priority from German Application No. 10 2015 113 136.6, filed Aug. 10, 2015, which is hereby incorporated by reference in its entirety for all purposes.

FIELD

The invention relates to a convertible vehicle.

BACKGROUND

Such a vehicle is known from practice and comprises a displaceable top formed as a folding roof (soft top) or a retractable hard top, said top being displaceable between a closed position, in which a vehicle interior is spanned, and a storage position, in which the vehicle interior is released upward. In the storage position, the top is arranged in a top storage space which can be closed via a storage space cover. When displacing the top, the storage space cover is displaced in an open position, so that the top can either be inserted into the top storage space or withdrawn from the top storage space, respectively.

In order to keep air turbulences at a minimum in the open position of the top, so-called wind deflectors are used in the rear of the vehicle interior, said wind deflectors comprising a net-like function element which is spanned on a wind deflector frame and which follows a vertical vehicle transverse plane in a function position. In order to be able to displace the top in a closed position, the wind deflector must be brought into a stowage position.

Furthermore, convertible vehicles known from practice comprise not only front seats but also a backseat for vehicle passengers. If a wind deflector is used for such vehicles, the wind deflector can be arranged behind the backseat or between the backseat and the backrest of the front seats depending on the passenger distribution. However, the displacing between the two function positions involves great mounting effort.

SUMMARY

It is the object of this invention to create a convertible vehicle of the type mentioned above comprising a wind deflector which is easily displaceable between different function positions.

The inventive object is attained by the convertible vehicle comprising the features of claim 1.

The wind deflector of the convertible vehicle according to the invention comprises two frames which are articulately jointed as well as pivotably displaceable to each other. Thus, it is possible to displace the wind deflector in at least two function positions. In a first function position, which is placed rearward regarding a second function position, the inner frame and the outer frame engage into each other. In the second function position, which is placed frontward regarding the first function position, the inner frame is folded out of the outer frame arranged on the storage space cover. In the stowage position, the inner frame and the outer frame are pivoted against the storage space cover as one unit, so that the wind deflector is laid up against the upper side of the storage space cover. Thus, the wind deflector can be displaced between the stowage position and the at least two function positions by a relative position of the frames and by means of the two hinge arrangements. Due to the storing of the wind deflector against the storage space cover, no additional construction space for storing the wind deflector needs to be made available in the corresponding convertible vehicle. In fact, the wind deflector is harmoniously integrated into the storage space cover.

In accordance with the invention, the drive of the designed wind deflector can be carried out manually or by means of a suitable drive engine or drive linkage being operated by a hydraulic or electric drive.

In an appropriate embodiment of the convertible vehicle according to the invention, the outer frame encompasses the inner frame entirely in the retracted stowing position.

In a specific embodiment, the outer frame entirely encompasses the inner frame in a first function position as well.

In a preferred embodiment of the convertible vehicle according to the invention, the outer frame reaches over the backrest of a backseat of the vehicle in a second function position, so that the inner frame is erected frontward from the backrest.

In order to give the convertible vehicle according to the invention a harmonious appearance, the storage space cover can comprise a recess at its outer side for receiving the wind deflector when it is in its rest position. It is possible that the recess is provided with a covering element.

The term "storage space cover" is to be understood in its widest sense. Thus, the storage space cover can be part of a tail gate of the convertible vehicle, the tailgate being used for the cargo space of the vehicle. The storage space cover can also form a rear hat shelf in the rear of the vehicle interior when the top is in a closed position, in which a vehicle interior is spanned by the top. The hat shelf preferably is located under a rear window of the vehicle integrated into the top.

Further advantages and advantageous embodiments of the subject matter of the invention can be taken from the description, from the drawing and from the Claims.

BRIEF DESCRIPTIONS OF THE DRAWINGS

An example embodiment of the convertible vehicle according to the invention is illustrated in a schematically simplified way in the drawing and is further described in the following description. In the figures.

DETAILED DESCRIPTION

Figure 1:
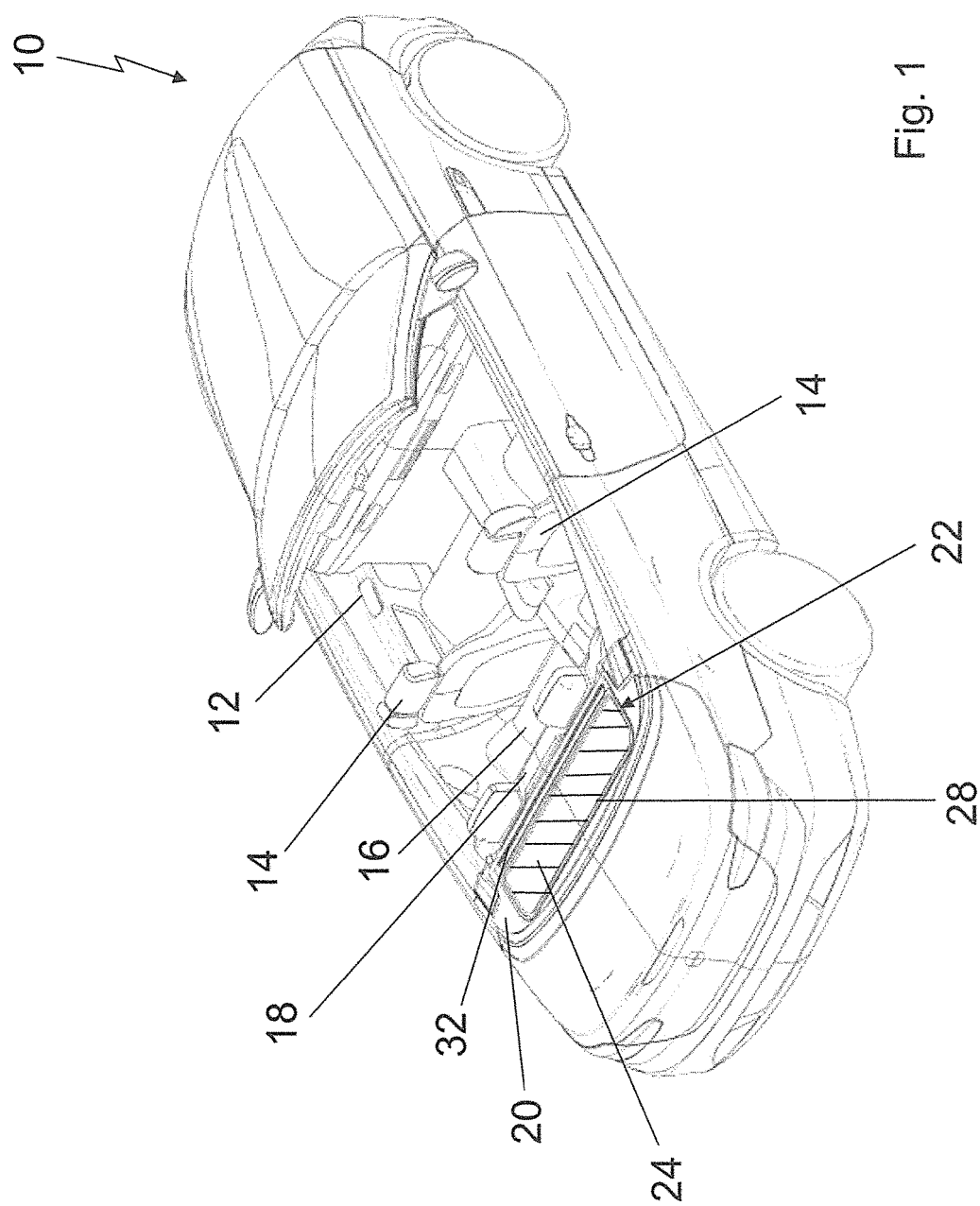
FIG. 1 shows a perspective top view of a convertible vehicle according to the invention having an open top and the wind deflector in storage position.
Figure 2:
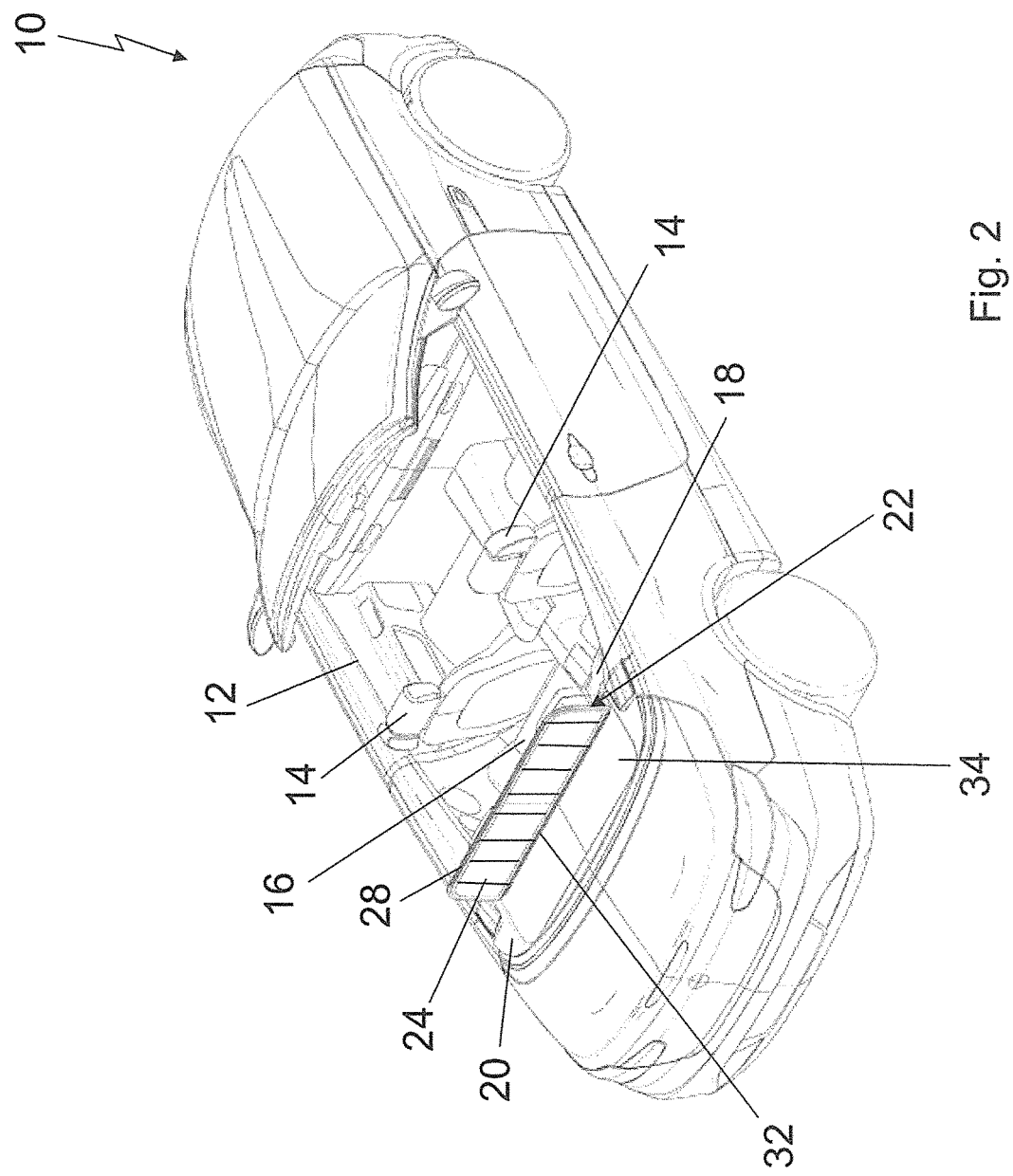
FIG. 2 shows a view corresponding to FIG. 1, except for the wind deflector being in a first function position.

In the drawings, a passenger car 10 formed as a convertible is illustrated, formed as a so-called four-seater and consequently comprises two front seats 14 and a backseat 16 having a backrest 18 in the vehicle interior 12. The backseat 16 comprises two seating recesses which are each arranged rearward regarding the respective front seats 14.

Furthermore, the passenger car 10 is provided with a displaceable top not further illustrated in the drawing, said top being displaceable between a closed position, in which a vehicle interior 12 is spanned, and a storage position illustrated in the drawings, in which the vehicle interior is released upward and the top is arranged in a rearward top storage space.

In the storage position, the top storage space is closed by means of a storage space cover 20, which, for displacing the top, is pivotable into an open position via a common displacement kinematic, so that the top can either be withdrawn from or retracted into the top storage space, respectively. In the closed position of the top, the storage space cover 20 forms a hat shelf which is arranged rearward from the backrest 18 of the backseat 16 and lies underneath the rear window of the passenger car 10 interpreted into the top.

In order to reduce undesirable air turbulences in the vehicle interior 12 while the passenger car 10 is in drive mode and the top is open, the passenger car 10 is provided with a wind deflector 22 which is supported by the storage space cover 20.

The wind deflector 22 comprises a net-like wind deflector function element 24 which is spanned to a circumferential inner frame 26. The inner frame 26 is supported pivotably by an outer frame 30 via a hinge arrangement 28 on a frame piece extending in the vehicle transverse direction. The outer frame 30, which is also formed circumferential, comprises another hinge arrangement 32 at a second frame piece extending in the vehicle transverse direction, said outer frame 30 being pivotably supported directly by the storage space cover 20. The pivot axes of the inner frame 26 and the outer frame 30 thus extend in the vehicle transverse direction.

Figure 5:
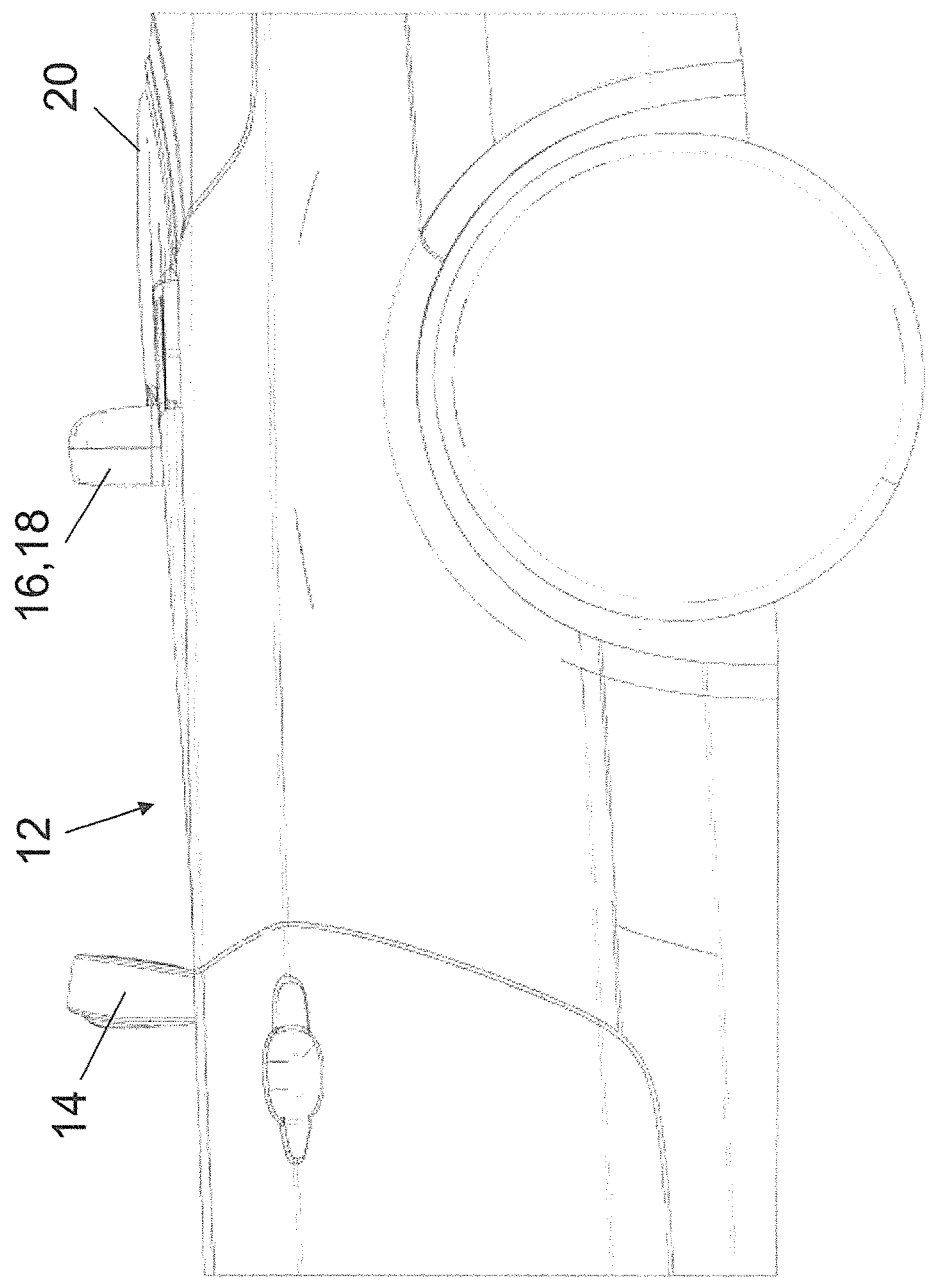
FIG. 5 shows a side view of the vehicle in the storage position of the wind deflector.
Figure 6:
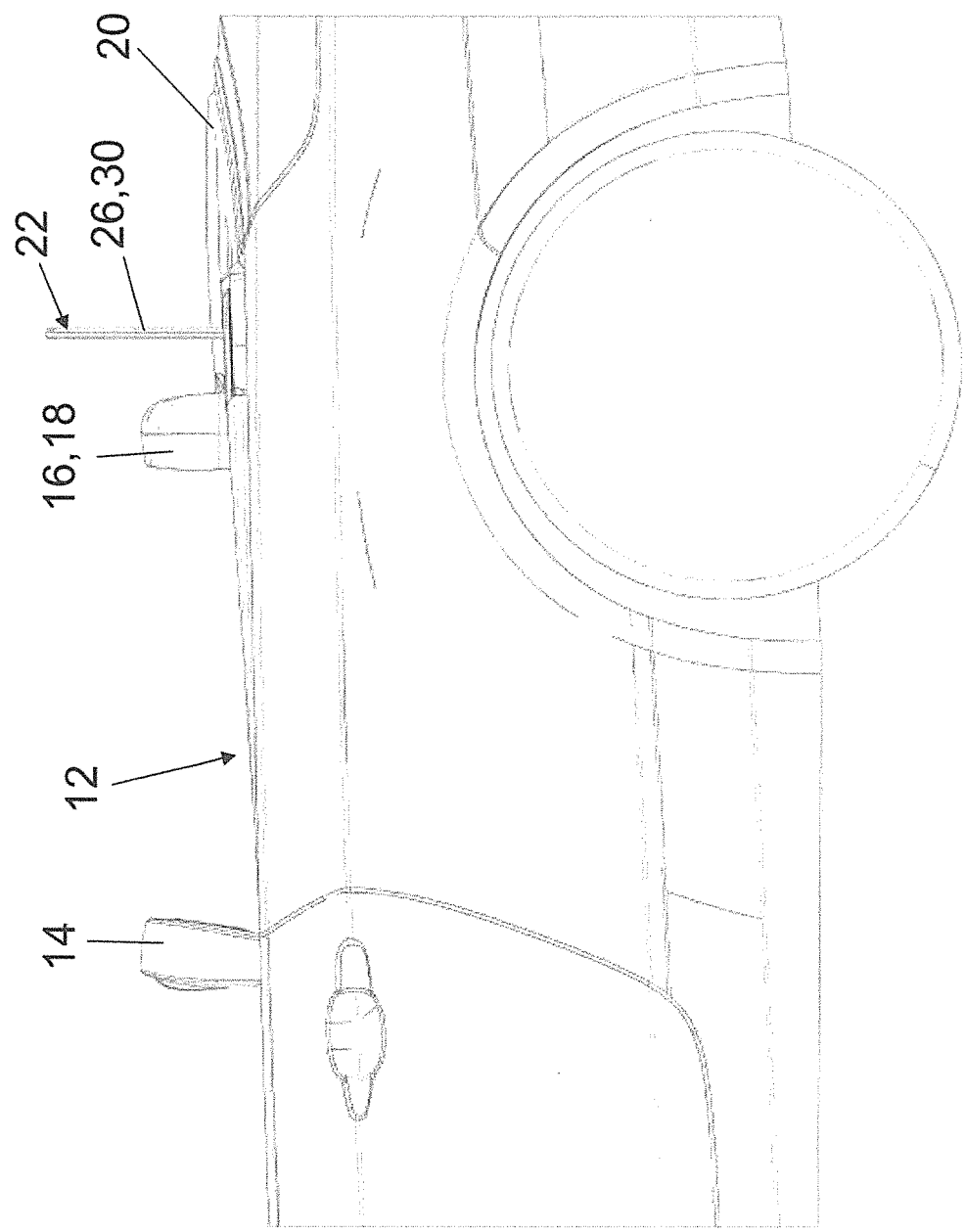
FIG. 6 shows a view corresponding to FIG. 5 of the wind deflector in the first function position.
Figure 9:
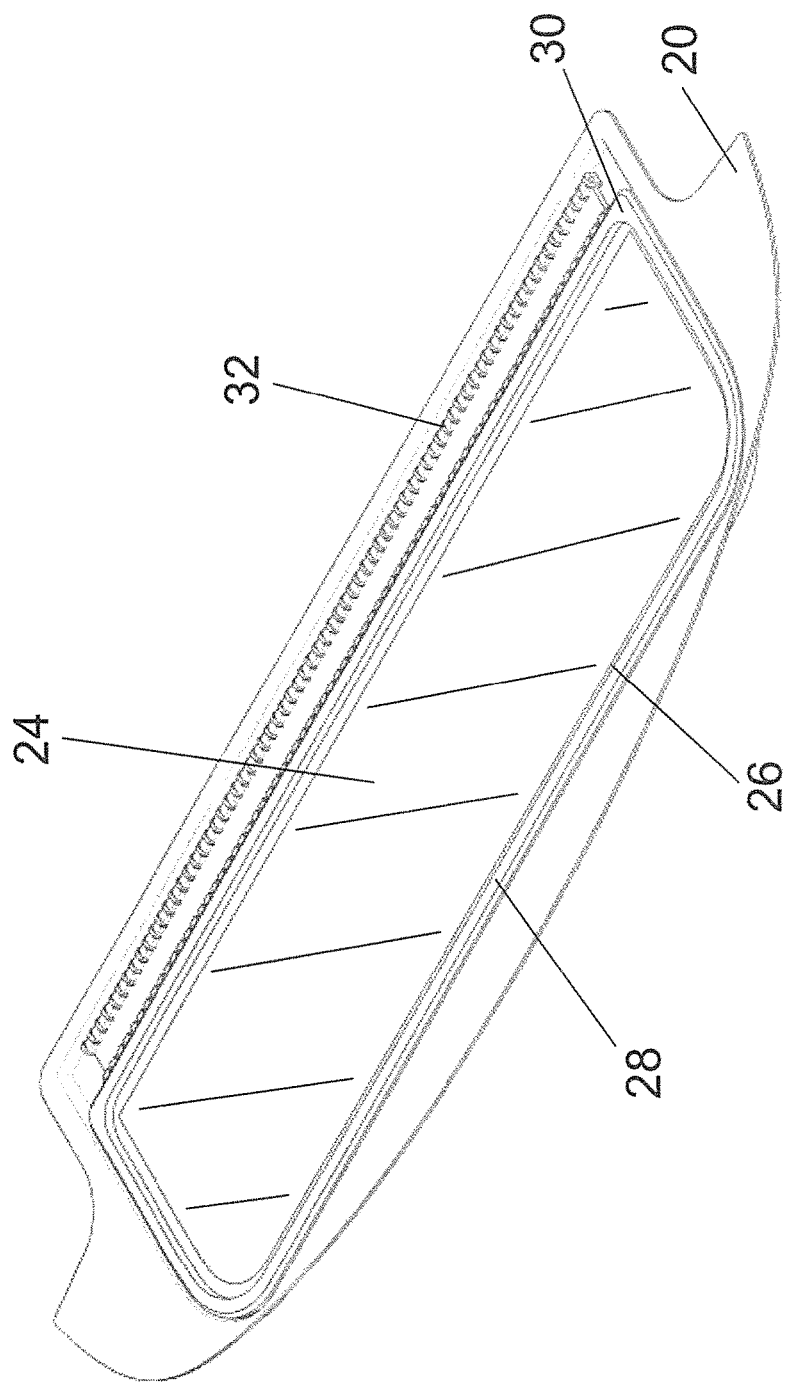
FIG. 9 shows a storage space cover with the wind deflector in its storage position.
Figure 10:
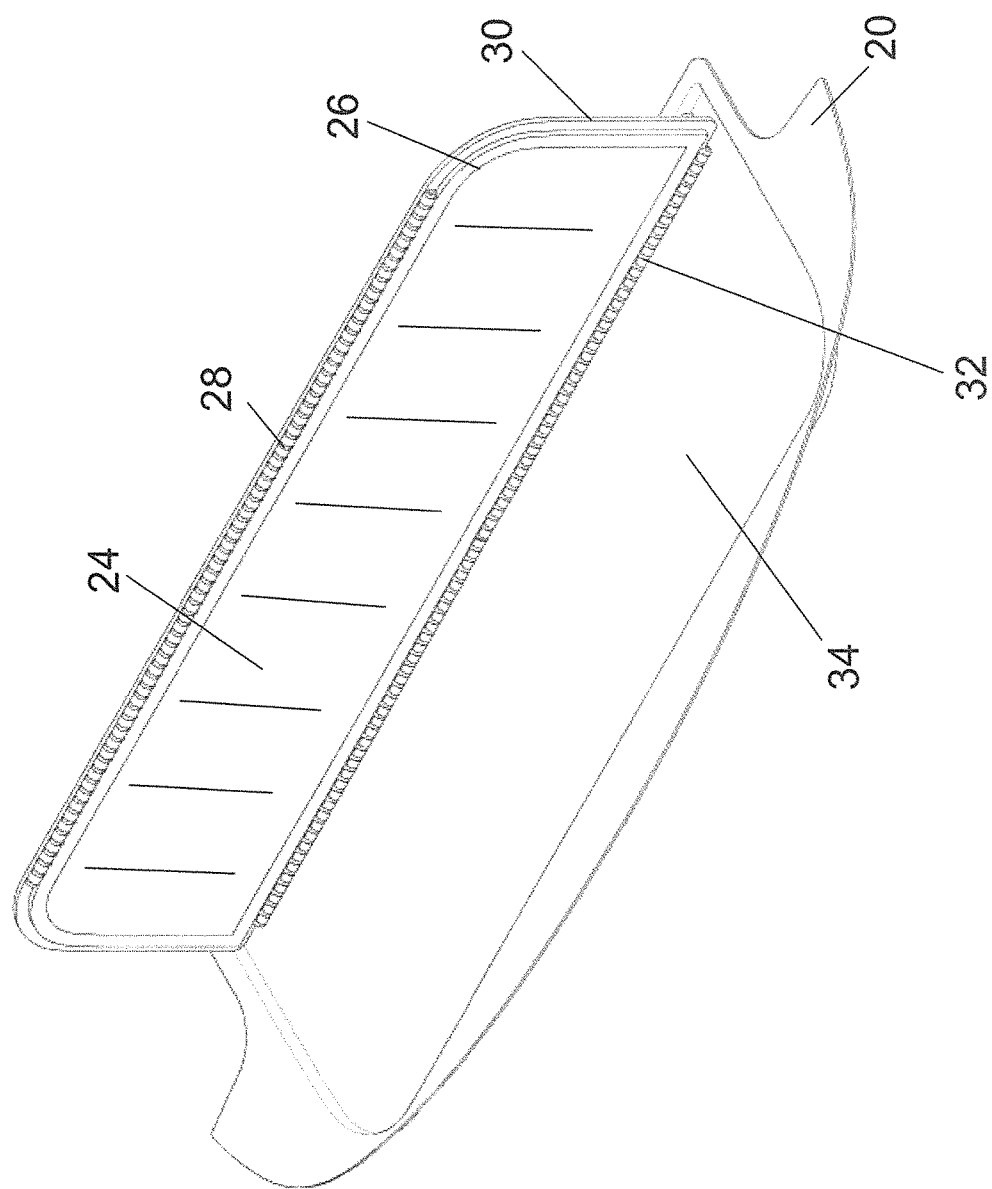
FIG. 10 shows the storage space cover and the wind deflector in its first function position.

The storage space cover 20 has a recess 34 on its upper side which receives the wind deflector in the stowage position illustrated in FIGS. 1, 5 and 9. The hinge arrangement 32 for linking the outer frame 30 is arranged frontward, that is at the front edge of the recess 34.

Starting from the stowage position in which the wind deflector 22 is received by the recess 34 and the inner frame 26 is circumferentially encompassed by the outer frame 30, the wind deflector 22 can be brought into a first function position via a common pivoting of the inner frame 26 and the outer frame 30 by 90° around the pivot axis formed by the hinge arrangement 32. In this first function position, the aerodynamically effective, net-like wind deflector function element 24, following a vertical vehicle transverse plane behind the backrest 18 of the backseat 16, extends in the vehicle transverse direction. In the first function position, in which the inner frame 26 is received by the outer frame 30, the backseat 16 can be used by passengers.

Figure 3:
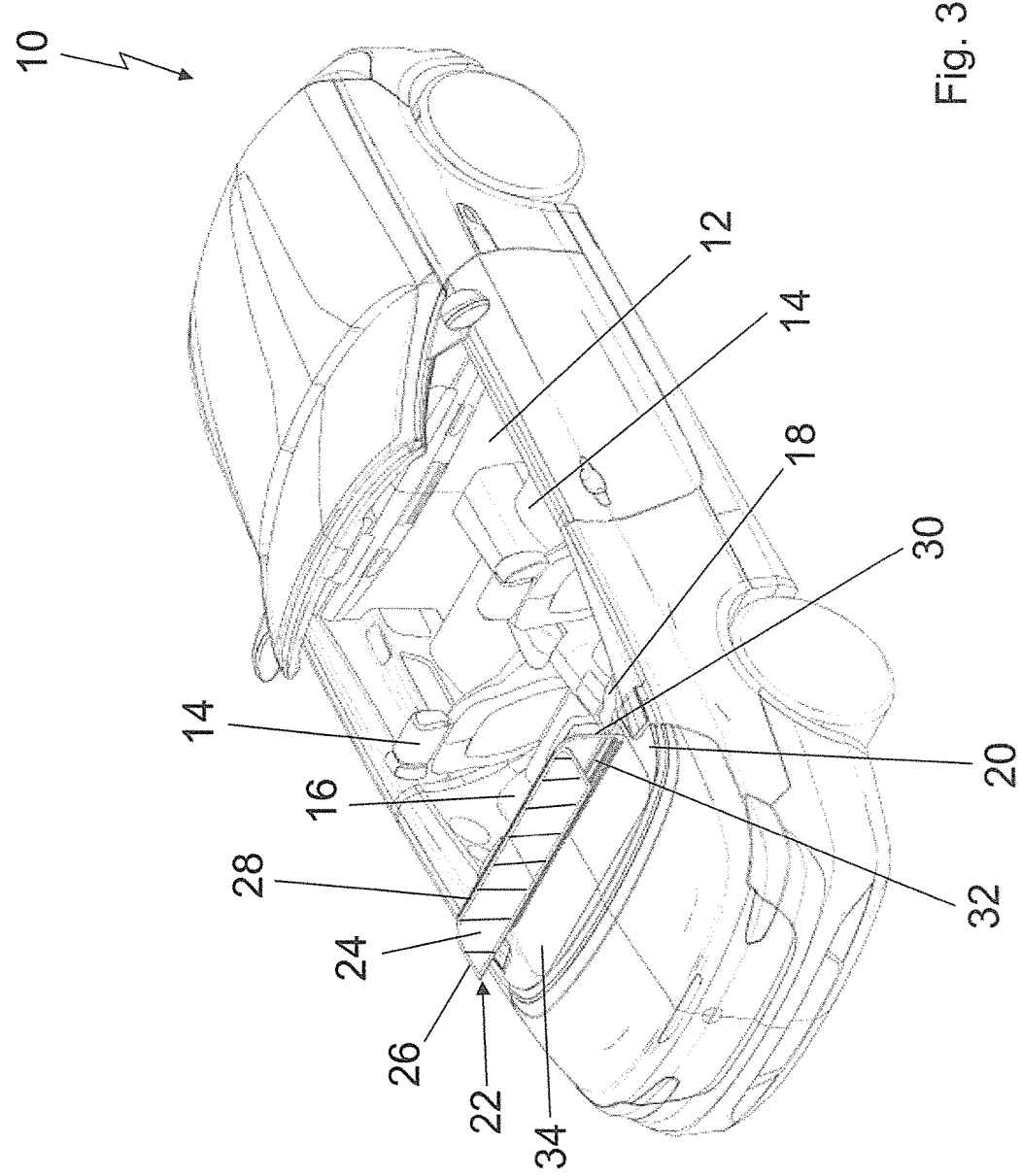
FIG. 3 shows a view also corresponding to FIG. 1, except for the wind deflector being in an intermediary position.
Figure 4:
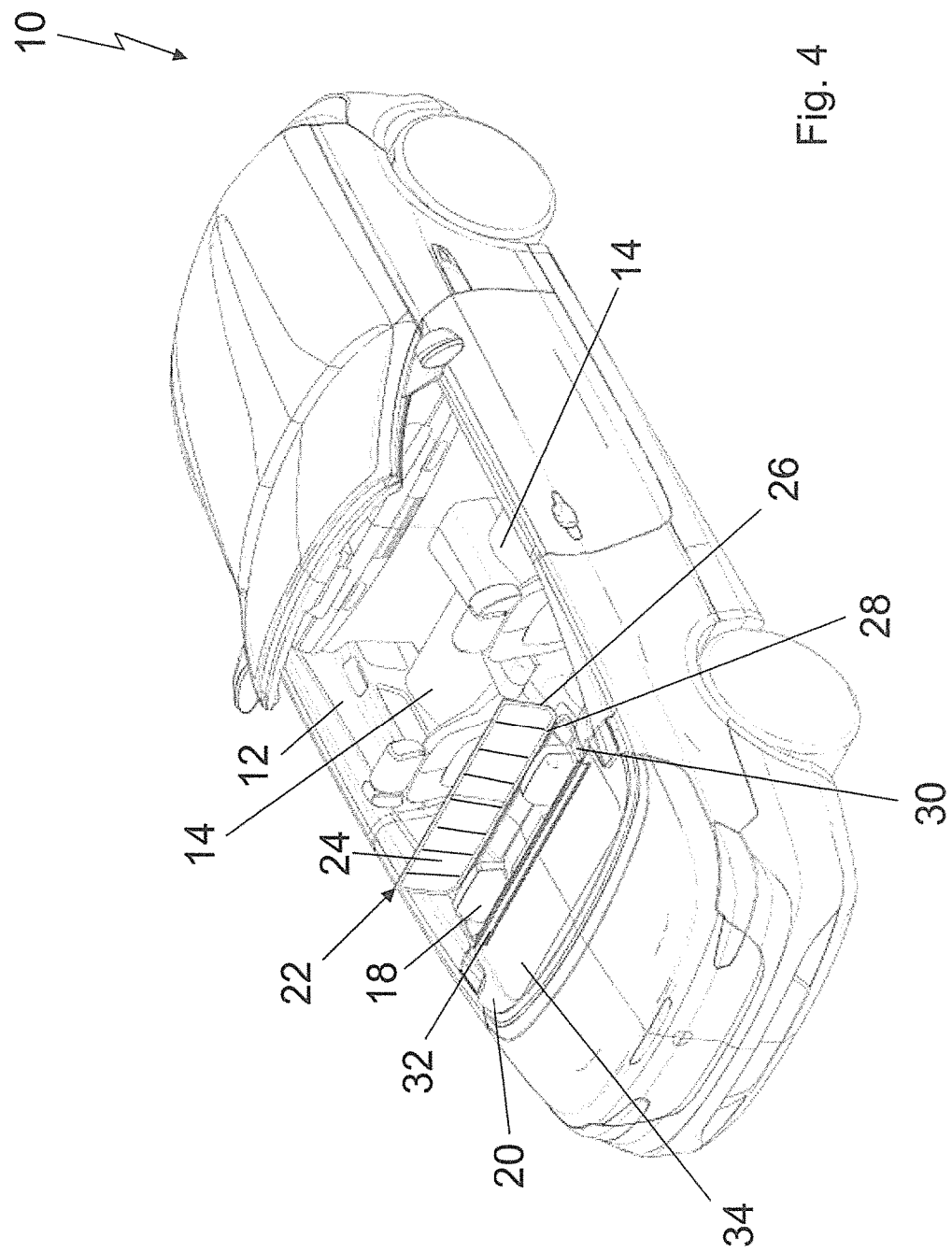
FIG. 4 shows a view also corresponding to FIG. 1, except for the wind deflector being in a second function position.
Figure 7:
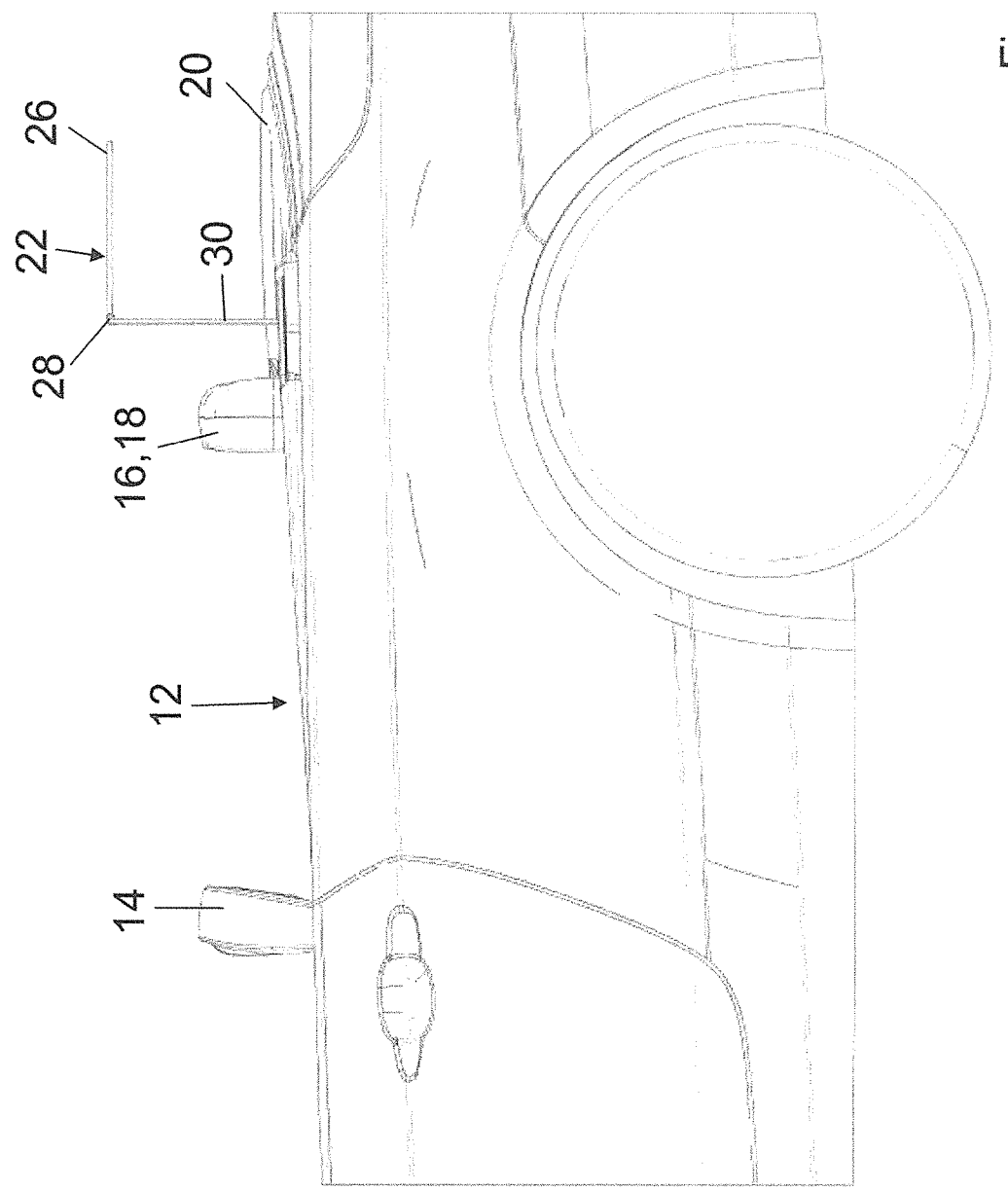
FIG. 7 shows a view corresponding to FIG. 5 of the wind deflector in the intermediary position.
Figure 8:
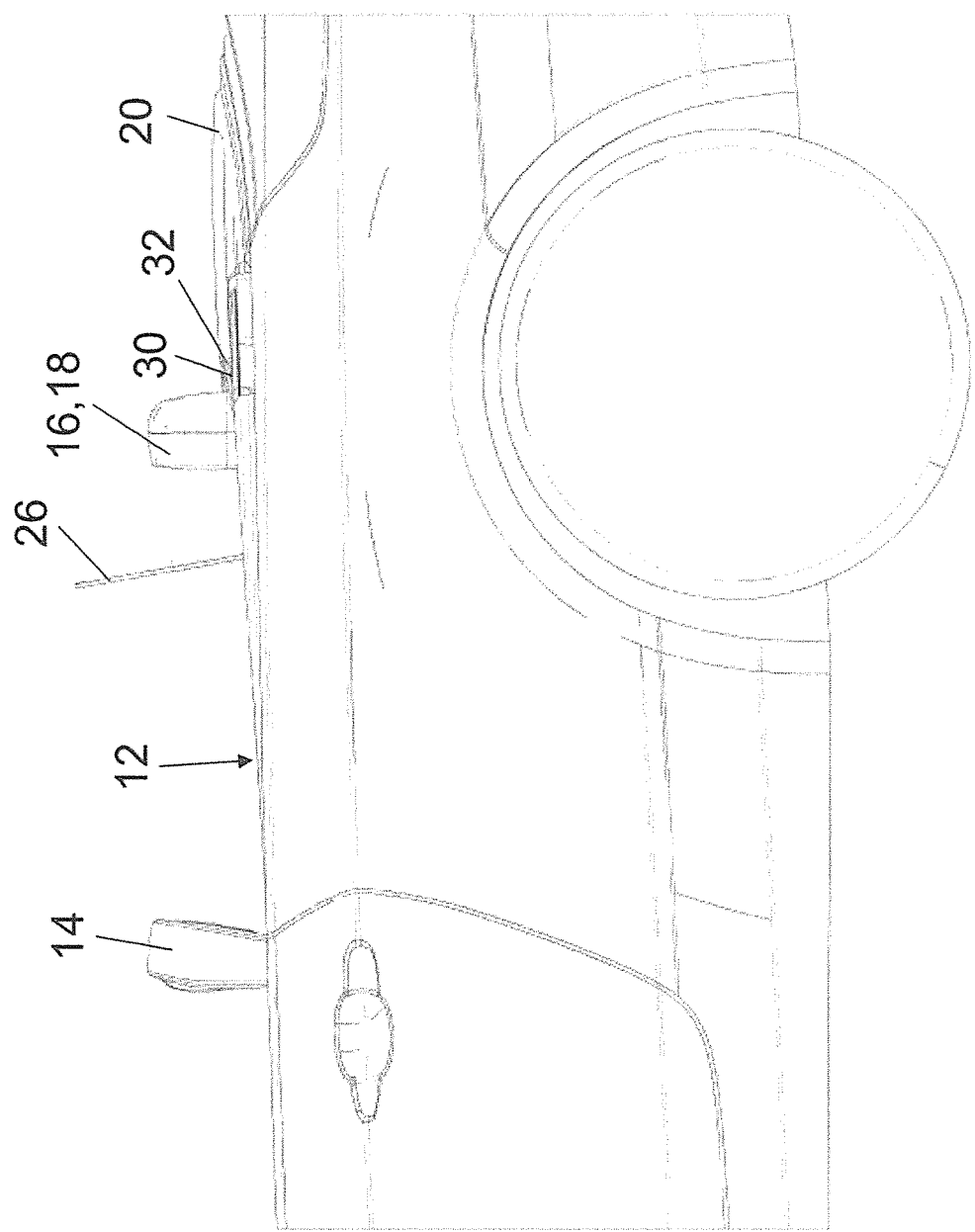
FIG. 8 shows a view corresponding to FIG. 5 of the wind deflector in the second function position.
Figure 11:
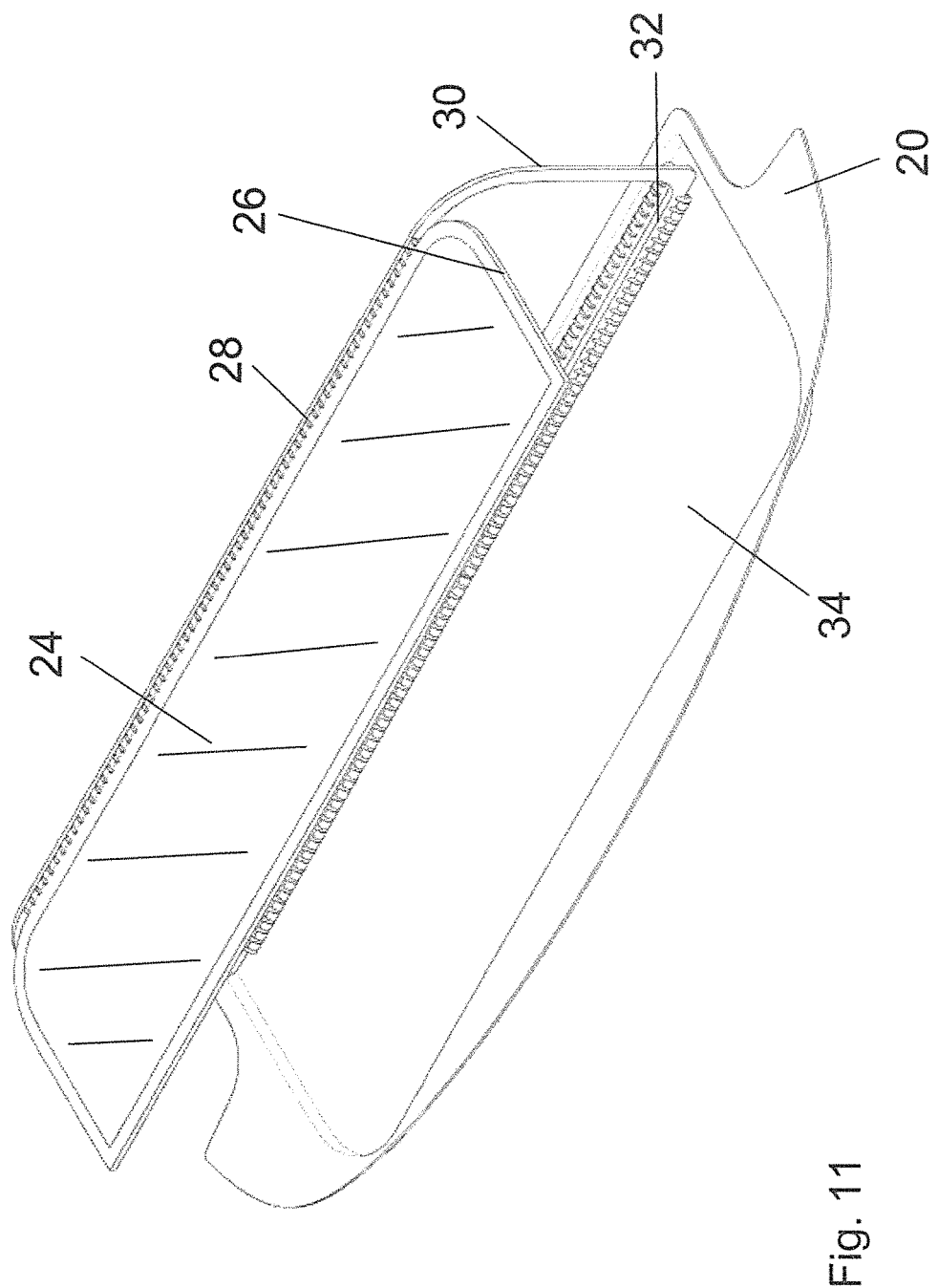
FIG. 11 shows the storage space cover and the wind deflector in its intermediary position.
Figure 12:
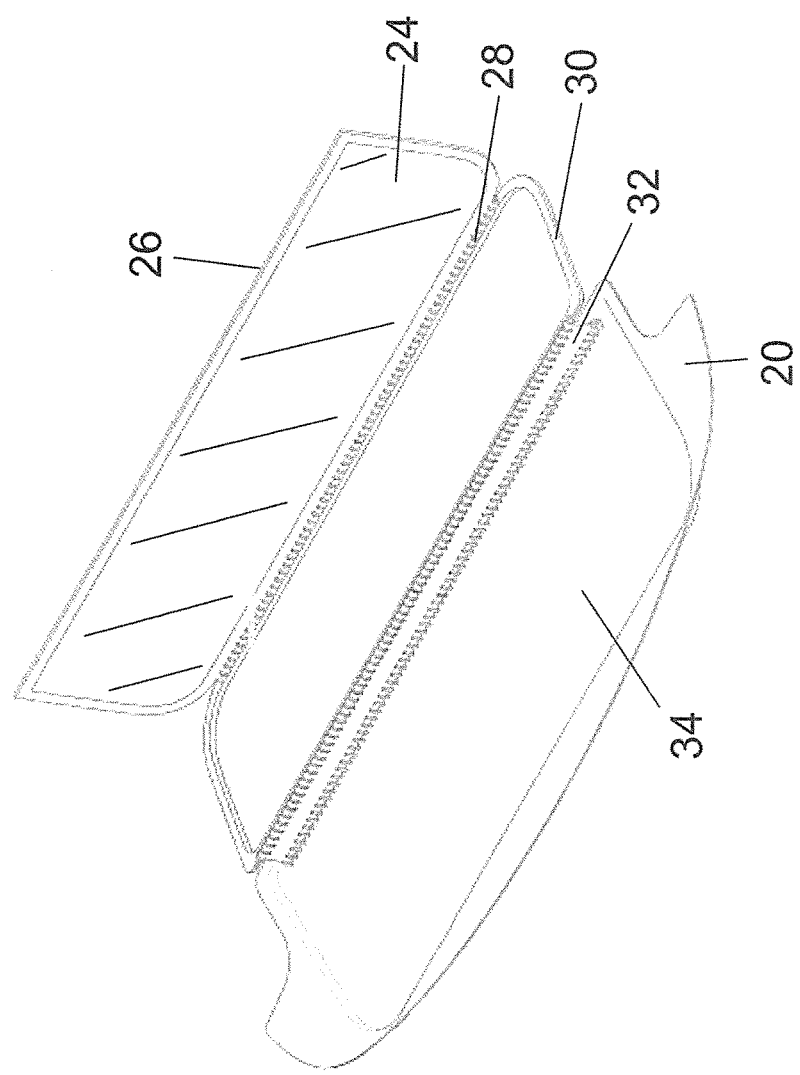
FIG. 12 shows the storage space cover and the wind deflector in its second function position.

In order to further minimize air turbulences in the area of the front seats 14 when the backseat 15 is not occupied, it is possible to bring the wind deflector 22 in a second function position illustrated in FIGS. 4, 8 and 12, in which the wind deflector function element 24 is arranged frontward regarding the backrest 18 of the backseat 16 and also follows an at least mostly vertical vehicle transverse plane. In order to realize the second function position, the inner frame 26, starting from the first function position, is pivoted out of the outer frame 30 around the hinge arrangement 28 formed by the pivot axis by about 90° (cf. FIGS. 3, 7 and 11). Subsequently, the unit consisting of the inner frame 26, the wind deflector function element 24 spanned on the inner frame 26 as well as the outer frame 30 is brought forward over the backrest 18 of the backseat 16 into the second function position illustrated in FIGS. 4, 8 and 12 around the pivot axis formed by the hinge arrangement 32 by about 90° to 100°. In the second function position, the outer frame 30 thus reaches over the backrest 18 of the backseat 16. Headrests arranged on the upper side of the backrest 18 reach through the outer frame 30.

In order to secure the different positions of the wind deflector 22, the hinge arrangements 28 and 32 can be provided with latching devices.

In the case at hand, the displacement of the wind deflector 22 between the stowage position and the function position is carried out manually. However, it is also possible to provide the wind deflector 22 with drive engines. It is also possible that the wind deflector 22 automatically takes up the function position or the stowage position, respectively, dependent on the top position and/or passenger occupation.

LIST OF REFERENCE NUMERALS 10 passenger car
12 vehicle interior
14 front seats
16 backseat
18 backrest
20 storage space cover
22 wind deflector
24 wind deflector function element
26 inner frame
28 hinge arrangement
30 outer frame
32 hinge arrangement
34 recess

The invention claimed is:

1. A convertible vehicle having
a displaceable top and
a top storage space, which can be closed using a storage space cover,
as well as a wind deflector, which is displaceable between a retracted stowage position and at least one erected function position and comprises an inner frame on which a wind deflector function element is spanned,
wherein the wind deflector comprises an outer frame, to which the inner frame is pivotably mounted and which is pivotably mounted to the storage space cover.

2. The convertible vehicle according to claim 1, wherein the outer frame entirely encompasses the inner frame in the retracted stowage position.

3. The convertible vehicle according to claim 1, wherein the outer frame entirely encompasses the inner frame in a first function position.

4. The convertible vehicle according to the claim 1, wherein the outer frame overlaps a backrest of a backseat of the vehicle in a second function position, so that the inner frame is erected frontward regarding the backrest.

5. The convertible vehicle according to claim 1, wherein the storage space cover comprises a recess on its outer side for receiving the wind deflector in its stowage position.

6. A convertible vehicle according to claim 1, wherein the storage space cover forms a rear hat shelf when the top is in a closed position and spans a vehicle interior.

* * * * *